(12) United States Patent
Park et al.

(10) Patent No.: US 11,973,190 B2
(45) Date of Patent: Apr. 30, 2024

(54) ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Sol Ji Park, Daejeon (KR); Kyoung Ho Ahn, Daejeon (KR); Jun Hyeok Han, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 264 days.

(21) Appl. No.: 17/612,791

(22) PCT Filed: Aug. 26, 2020

(86) PCT No.: PCT/KR2020/011367
§ 371 (c)(1),
(2) Date: Nov. 19, 2021

(87) PCT Pub. No.: WO2021/040392
PCT Pub. Date: Mar. 4, 2021

(65) Prior Publication Data
US 2022/0246985 A1    Aug. 4, 2022

(30) Foreign Application Priority Data

Aug. 30, 2019   (KR) .................. 10-2019-0107364

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0034* (2013.01)

(58) Field of Classification Search
CPC ......... H01M 10/0566; H01M 10/0567; H01M 10/0525; H01M 10/0568; H01M 10/0569
See application file for complete search history.

(56) References Cited

U.S. PATENT DOCUMENTS

| | | | |
|---|---|---|---|
| 2012/0171576 A1 | 7/2012 | Tsai et al. | |
| 2012/0171579 A1 | 7/2012 | Tsai et al. | |
| 2014/0322616 A1 | 10/2014 | Onozaki et al. | |
| 2015/0171476 A1 | 6/2015 | Onozaki et al. | |
| 2015/0380769 A1* | 12/2015 | Chiga ............... | H01M 10/0567 429/343 |
| 2016/0190650 A1 | 6/2016 | Seo et al. | |
| 2018/0108935 A1 | 4/2018 | Noguchi et al. | |
| 2019/0058216 A1 | 2/2019 | Oh et al. | |
| 2019/0074545 A1 | 3/2019 | Jeong et al. | |
| 2019/0123390 A1 | 4/2019 | Xu et al. | |
| 2019/0148773 A1 | 5/2019 | Kim et al. | |
| 2019/0198925 A1 | 6/2019 | Lee et al. | |
| 2019/0245244 A1 | 8/2019 | Lim et al. | |
| 2019/0379087 A1 | 12/2019 | Oh et al. | |
| 2021/0151800 A1 | 5/2021 | Shin et al. | |

FOREIGN PATENT DOCUMENTS

| | | |
|---|---|---|
| CN | 108886169 A | 11/2018 |
| CN | 109075386 A | 12/2018 |
| CN | 109891654 A | 6/2019 |
| JP | 2002319433 A | 10/2002 |
| JP | 2012033286 A | 2/2012 |
| JP | 2012121876 A | 6/2012 |
| JP | 2016038997 A | 3/2016 |
| JP | 2019046792 A | 3/2019 |
| JP | 2021520053 A | 8/2021 |
| KR | 20160081109 A | 7/2016 |
| KR | 20180065958 A | 6/2018 |
| KR | 20180066724 A | 6/2018 |
| KR | 20180083272 A | 7/2018 |
| KR | 20190017477 A | 2/2019 |
| WO | 2013146359 A1 | 10/2013 |
| WO | 2016175217 A1 | 11/2016 |
| WO | 2018106078 A1 | 6/2018 |
| WO | 2019088733 A1 | 5/2019 |

OTHER PUBLICATIONS

Chawla N. et al., "Recent Advances in Non-Flammable Electrolytes for Safer Lithium-Ion Batteries," Batteries, Feb. 2019, pp. 1-25, MDPI.
International Search Report for Application No. PCT/KR2020/011367 dated Dec. 2, 2020, pp. 1-2.

\* cited by examiner

*Primary Examiner* — Nathanael T Zemui
(74) *Attorney, Agent, or Firm* — Lerner David LLP

(57) ABSTRACT

An electrolyte for a lithium secondary battery and a lithium secondary battery including the same are disclosed herein. In some embodiments, an electrolyte for a lithium secondary battery includes a lithium salt, a non-aqueous solvent containing a fluorine-based organic solvent, and a fluorine-based compound represented by Formula 1. In some embodiments, a lithium secondary battery includes a positive electrode, a negative electrode, a separator disposed therebetween, and the electrolyte.

15 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/011367, filed on Aug. 26, 2020, which claims priority from Korean Patent Application No. 10-2019-0107364, filed on Aug. 30, 2019, the disclosures of which are incorporated by reference herein.

TECHNICAL FIELD

The present invention relates to an electrolyte for a lithium secondary battery and a lithium secondary battery including the same, and more particularly, to an electrolyte for a lithium secondary battery which has excellent high-temperature life characteristics and thermal stability, and a lithium secondary battery including the same.

BACKGROUND ART

A lithium secondary battery is generally prepared by a method in which, after an electrode assembly is formed by disposing a separator between a positive electrode, which includes a positive electrode active material formed of a transition metal oxide containing lithium, and a negative electrode including a negative electrode active material capable of storing lithium ions and the electrode assembly is inserted into a battery case, a non-aqueous electrolyte that becomes a medium for transferring the lithium ions is injected thereinto and the battery case is then sealed.

The non-aqueous electrolyte is generally composed of a lithium salt and an organic solvent capable of dissolving the lithium salt, wherein $LiPF_6$ has been mainly used as the lithium salt. However, since a $PF_6^-$ anion is very vulnerable to heat, the $PF_6^-$ anion is thermally decomposed to generate a Lewis acid, such as $PF_5$, when the battery is exposed to high temperatures. The Lewis acid, such as PFs, not only causes decomposition of the organic solvent such as ethylene carbonate, but also destructs a solid electrolyte interphase (SEI), which is formed by a reduction reaction on a surface of an active material having an operating voltage outside an electrochemical stabilization window of an electrolyte solution, to increase resistance and degrade battery performance. Also, a heat generation or ignition phenomenon may occur in the battery due to an increase in interfacial resistance of the battery.

Thus, there is a need to develop an electrolyte for a lithium secondary battery in which the degradation of the battery performance at high temperatures is small and thermal stability is excellent.

DISCLOSURE OF THE INVENTION

Technical Problem

An aspect of the present invention provides an electrolyte for a lithium secondary battery, which may achieve excellent high-temperature life characteristics and thermal stability by including a fluorine-based organic solvent and a fluorine-based compound having a specific structure, and a lithium secondary battery including the same.

Technical Solution

According to an aspect of the present invention, there is provided an electrolyte for a lithium secondary battery which includes a lithium salt; a non-aqueous solvent containing a fluorine-based organic solvent; and a fluorine-based compound represented by Formula 1.

[Formula 1]

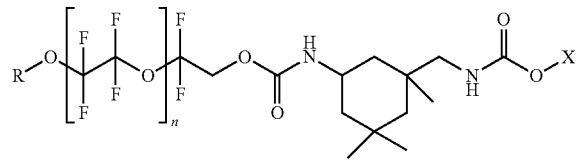

In Formula 1, n is an integer of 1 to 300, R is hydrogen, halogen, an alkyl group having 1 to 6 carbon atoms, or a halogen-substituted alkyl group having 1 to 6 carbon atoms, and X is a functional group represented by the following Formula 2.

[Formula 2]

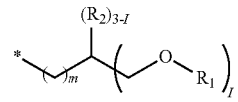

In Formula 2, m is an integer of 0 to 4, I is an integer of 1 to 3, $R_1$ and $R_2$ are each independently hydrogen, halogen, an alkyl group having 1 to 6 carbon atoms, or a halogen-substituted alkyl group having 1 to 6 carbon atoms, and, when two or more $R_1$ and $R_2$ are present, each of $R_1$ and $R_2$ may be the same or different.

According to another aspect of the present invention, there is provided a lithium secondary battery including a positive electrode, a negative electrode, a separator disposed between the positive electrode and the negative electrode, and the electrolyte for a lithium secondary battery of the present invention.

Advantageous Effects

Since an electrolyte according to the present invention may suppress heat generation/ignition in a battery by using a fluorine-based solvent with excellent flame retardancy, thermal stability is excellent.

Also, since the electrolyte according to the present invention uses the fluorine-based solvent and a fluorine-based compound having a specific structure together, surface tension of the electrolyte is reduced, and, as a result, there is an effect of improving electrode wetting and adhesion to an electrode.

A lithium secondary battery, in which the electrolyte of the present invention as described above is used, has excellent high-temperature life characteristics and stability.

MODE FOR CARRYING OUT THE INVENTION

Hereinafter, the present invention will be described in more detail.

Electrolyte

An electrolyte according to the present invention includes a lithium salt, a non-aqueous solvent containing a fluorine-based organic solvent, and a fluorine-based compound.

(1) Lithium Salt

Various lithium salts typically used in an electrolyte for a lithium secondary battery may be used as the lithium salt without limitation, and, for example, the lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, B$_{10}$Cl$_{10}^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, CH$_3$SO$_3^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$ as an anion.

Specifically, the lithium salt may include at least one selected from the group consisting of LiCl, LiBr, LiI, LiBF$_4$, LiClO$_4$, LiAlO$_4$, LiAlCl$_4$, LiPF$_6$, LiSbF$_6$, LiAsF$_6$, LiB$_{10}$Cl$_{10}$, LiBOB (LiB(C$_2$O$_4$)$_2$), LiCF$_3$SO$_3$, LiTFSI (LiN(SO$_2$CF$_3$)$_2$), LiFSI (LiN(SO$_2$F)$_2$), LiCH$_3$SO$_3$, LiCF$_3$CO$_2$, LiCH$_3$CO$_2$, and LiBETI (LiN(SO$_2$CF$_2$CF$_3$)$_2$). Specifically, the lithium salt may include a single material selected from the group consisting of LiBF$_4$, LiClO$_4$, LiPF$_6$, LiBOB (LiB(C$_2$O$_4$)$_2$), LiCF$_3$SO$_3$, LiTFSI (LiN(SO$_2$CF$_3$)$_2$), and LiBETI (LiN(SO$_2$CF$_2$CF$_3$)$_2$), or a mixture of two or more thereof.

The lithium salt may be appropriately changed in a normally usable range, but may be included in a concentration of 0.4 M to 4.0 M, for example, 1.0 M to 3.0 M in the electrolyte to obtain an optimum effect of forming a film for preventing corrosion of a surface of an electrode. If the concentration of the lithium salt is less than 0.4 M, an effect of improving low-temperature output and cycle characteristics during high-temperature storage of a lithium secondary battery is insignificant, and, if the concentration of the lithium salt is greater than 4.0 M, impregnability of an electrolyte solution may be reduced due to an increase in viscosity of the electrolyte.

(2) Non-Aqueous Solvent

The electrolyte of the present invention includes a non-aqueous solvent, and the non-aqueous solvent contains a fluorine-based organic solvent.

Since the fluorine-based organic solvent is not easily decomposed at high temperature and high voltage and has flame retardancy, it may suppress generation of gas due to an electrolyte solution decomposition reaction and a heat generation/ignition phenomenon due to an increase in resistance when it is used as a solvent of the electrolyte.

As the fluorine-based organic solvent, for example, fluoroethylene carbonate (FEC), difluoroethylene carbonate (DFEC), fluorodimethyl carbonate (F-DMC), fluoroethyl methyl carbonate (FEMC), 2,2-bis(trifluoromethyl)-1,3-dioxolane (TFDOL), methyl 2,2,2-trifluoroethyl carbonate (F3-EMC), trifluoroethyl phosphite (TFEPi), trifluoroethyl phosphate (TFEPa), 1,1,2,2-tetrafluoroethyl 2,2,2-trifluoroethyl ether, 1,1,2,2-tetrafluoroethyl 2,2,3,3-tetrafluoropropyl ether, monofluorobenzene (FB), difluorobenzene, trifluorobenzene, tetrafluorobenzene, pentafluorobenzene, hexafluorobenzene, 1,1,2,2-tetrafluoro-3-(1,1,2,2-tetrafluoroethoxy)propane, methyl difluoroacetate, ethyl difluoroacetate, difluoroethyl acetate, or a mixture thereof may be used.

Among them, fluoroethylene carbonate (FEC), methyl 2,2,2-trifluoroethyl carbonate (F3-EMC), 1,1,2,2-tetrafluoroethyl 2,2,2-trifluoroethyl ether, 1,1,2,2-tetrafluoroethyl 2,2,3,3-tetrafluoropropyl ether, or a mixture thereof may particularly be used. In a case in which the above compounds are used, cell lifetime may be maintained and durability, such as high-temperature safety, may be improved by forming a more stable film (LiF) on a negative electrode.

The fluorine-based organic solvent may be included in an amount of 5 parts by weight to 100 parts by weight, preferably 10 parts by weight to 95 parts by weight, and more preferably 20 parts by weight to 90 parts by weight based on 100 parts by weight of the non-aqueous solvent. In a case in which the amount of the fluorine-based organic solvent satisfies the above range, high temperature/high voltage safety may be improved, and an effect of controlling heat generation characteristics without impairing ion transfer capability may be obtained.

The non-aqueous solvent may further include a non-fluorine-based organic solvent in addition to the fluorine-based organic solvent when it is necessary to improve physical properties.

The non-fluorine-based organic solvent means an organic solvent that does not contain a fluorine atom, wherein various organic solvents typically used in an electrolyte for a lithium secondary battery may be used without limitation. For example, the non-fluorine-based organic solvent may include a cyclic carbonate-based organic solvent, a linear carbonate-based organic solvent, a linear ester-based organic solvent, a cyclic ester-based organic solvent, or a mixture thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, ε-valerolactone, and ε-caprolactone.

The non-fluorine-based organic solvent may be included in an amount of 95 parts by weight or less, preferably 5 parts by weight to 95 parts by weight, and more preferably 10 parts by weight to 80 parts by weight based on 100 parts by weight of the non-aqueous solvent. In a case in which the non-fluorine-based organic solvent is further added, an effect of improving a degree of dissociation of the lithium salt, electrolyte solution permittivity, and viscosity properties may be obtained.

(3) Fluorine-Based Compound

The electrolyte of the present invention includes a fluorine-based compound represented by the following Formula 1.

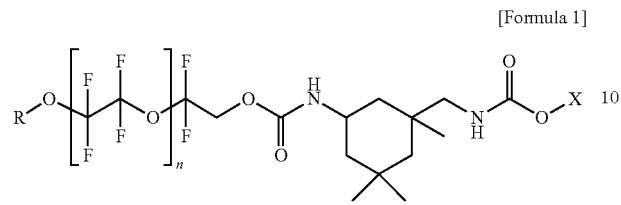

[Formula 1]

In Formula 1, n is an integer of 1 to 300, and is preferably an integer of 10 to 100.

R is hydrogen, halogen, an alkyl group having 1 to 6 carbon atoms, or a halogen-substituted alkyl group having 1 to 6 carbon atoms, preferably hydrogen or a fluorine-substituted alkyl group having 1 to 4 carbon atoms, and more preferably hydrogen or —$CF_2CF_3$.

X is a functional group represented by the following Formula 2.

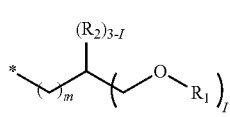

[Formula 2]

In Formula 2, m is an integer of 0 to 4, is preferably an integer of 0 to 3, and is more preferably 1 or 2.

$l$ is an integer of 1 to 3, and is preferably 1 or 3.

$R_1$ and $R_2$ are each independently hydrogen, halogen, an alkyl group having 1 to 6 carbon atoms, or a halogen-substituted alkyl group having 1 to 6 carbon atoms, preferably hydrogen or a fluorine-substituted alkyl group having 1 to 4 carbon atoms, and more preferably hydrogen or —$CF_2CF_3$. When two or more $R_1$ and $R_2$ are present, each of $R_1$ and $R_2$ may be the same or different.

The fluorine-based compound represented by [Formula 1] is a component for improving wetting of the electrolyte and electrode adhesion. In a case in which the fluorine-based organic solvent is used as in the present invention, an effect of improving high-temperature characteristics and thermal stability may be obtained, but, since the fluorine-based organic solvent has higher viscosity than a non-fluorine-based organic solvent generally used as an electrolyte solvent, there is a problem that electrode wetting is poor. As a result of a significant amount of research conducted, the present inventors recognized that the problem as described above may be solved by using the compound of Formula 1 and the fluorine-based organic solvent together.

With respect to the compound of Formula 1, since a polar part and a non-polar part coexist in a polymer structure, surface tension of the electrolyte is reduced when the compound is added. Thus, in a case in which the fluorine-based solvent and the fluorine-based compound represented by Formula 1 are used together, the thermal stability and high-temperature characteristics may be improved while the surface tension of the electrolyte is reduced to minimize a decrease in the electrode wetting and electrode adhesion.

Specifically, the fluorine-based compound represented by Formula 1 may be a compound represented by Formula 1-1 or a compound represented by Formula 1-2 below.

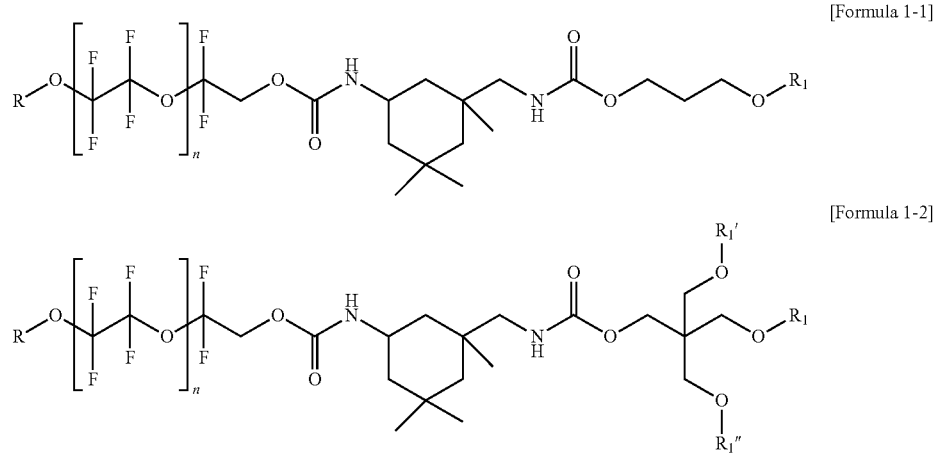

[Formula 1-1]

[Formula 1-2]

In Formula 1-1 and Formula 1-2, n is an integer of 1 to 300, and is preferably an integer of 10 to 100.

R is hydrogen, halogen, an alkyl group having 1 to 6 carbon atoms, or a halogen-substituted alkyl group having 1 to 6 carbon atoms, preferably hydrogen or a fluorine-substituted alkyl group having 1 to 4 carbon atoms, and more preferably hydrogen or —$CF_2CF_3$.

$R_1$, $R_1'$, and $R_1''$ are each independently hydrogen, halogen, an alkyl group having 1 to 6 carbon atoms, or a halogen-substituted alkyl group having 1 to 6 carbon atoms, preferably hydrogen or a fluorine-substituted alkyl group having 1 to 4 carbon atoms, and more preferably hydrogen or —$CF_2CF_3$.

The fluorine-based compound represented by Formula 1 may have a weight-average molecular weight of 60,000 g/mol or less, preferably 4,000 g/mol to 40,000 g/mol, and more preferably 4,000 g/mol to 30,000 g/mol. The reason for this is that solubility in the fluorine-based solvent may decrease when the weight-average molecular weight of the fluorine-based compound is greater than 60,000 g/mol.

The fluorine-based compound represented by Formula 1 may be included in an amount of 0.001 wt % to 30 wt %, preferably 0.01 wt % to 10 wt %, and more preferably 0.01 wt % to 5 wt % based on a total weight of the electrolyte. When the amount of the fluorine-based compound satisfies the above range, an effect of improving the wetting and battery stability is excellent.

(4) Others

The electrolyte according to the present invention may further include an ionic liquid or additive, if necessary.

The ionic liquid is to improve the battery stability, wherein it is a compound containing an organic cation and an organic or inorganic anion. Types of the cation and anion contained in the ionic liquid are not particularly limited.

For example, the cation contained in the ionic liquid may include a pyridinium cation, a piperidinium cation, a pyrrolidinium cation, a cation having a pyrroline skeleton, a cation having a pyrrole skeleton, an imidazolium cation, a tetrahydropyrimidinium cation, a dihydropyrimidinium cation, a pyrazolium cation, a pyrazolinium cation, a tetraalkylammonium cation, a trialkylsulfonium cation, or a tetraalkylphosphonium cation.

The anion contained in the ionic liquid may include $F^-$, $Cl^-$, $Br^-$, $I^-$, $NO_3^-$, $(CN)_2N^-$, $BF_4^-$, $ClO_4^-$, $RSO_3^-$ (where, R is an alkyl group having 1 to 9 carbon atoms or phenyl group), $RCOO^-$ (where, R is an alkyl group having 1 to 9 carbon atoms or phenyl group), $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $(CF_3SO_3^-)_2$, $(CF_2CF_2SO_3^-)_2$, $(C_2F_5SO_2)_2N^-$, $(CF_3SO_3)_2N^-$, $(CF_3SO_2)(CF_3CO)N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3COO^-$, $C_3F_7COO^-$, $CF_3SO_3^-$, or $C_4F_9SO_3^-$.

Specifically, the ionic liquid may include 1-ethyl-3-methylimidazolium bis(fluorosulfonyl)imide (EMIM FSI), 1-methyl-1-propylpyrrolidinium bis(trifluorosulfonyl)imide (PYR13 TFSI), or a combination thereof, but the ionic liquid is not limited thereto.

The ionic liquid may be included in an amount of 30 wt % or less, preferably 1 wt % to 10 wt %, and more preferably 1 wt % to 5 wt % based on the total weight of the electrolyte for a lithium secondary battery. In a case in which the amount of the ionic liquid satisfies the above range, an effect of reducing battery heat generation or improving battery safety may be obtained without adversely affecting ionic conductivity and viscosity.

Also, in order to prevent an electrolyte solution from being decomposed to cause collapse of a negative electrode in a high output environment, or further improve low-temperature high-rate discharge characteristics, high-temperature stability, overcharge protection, and a battery swelling suppression effect at high temperatures, the electrolyte according to the present invention may further include additives.

Examples of the additive may be at least one selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound, for example, may include vinylene carbonate (VC) or vinyl ethylene carbonate.

The halogen-substituted carbonate-based compound, for example, may include fluoroethylene carbonate (FEC).

The sultone-based compound, for example, may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may include ethylene sulfate (Esa), trimethylene sulfate (TMS), or methyl trimethylene sulfate (MTMS).

The phosphate-based compound, for example, may include at least one compound selected from the group consisting of lithium difluoro bis(oxalato)phosphate, lithium difluorophosphate, tetramethyl trimethylsilyl phosphate, trimethylsilyl phosphite, tris(2,2,2-trifluoroethyl)phosphate, and tris(trifluoroethyl)phosphite.

The borate-based compound, for example, may include tetraphenylborate and lithium oxalyldifluoroborate.

The nitrile-based compound, for example, may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound, for example, may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato) borate (LiB $(C_2O_4)_2$)), and $LiBF_4$.

The additives may be used as a mixture of two or more thereof, and may be included in an amount of 0.01 wt % to 50 wt %, particularly 0.01 wt % to 10 wt %, and preferably 0.05 wt % to 5 wt % based on the total weight of the electrolyte. If the amount of the additive is less than 0.01 wt %, an effect of improving physical properties is insignificant, and, if the amount of the additive is greater than 50 wt %, there is a possibility that a side reaction occurs excessively during charge and discharge of the battery due to the excessive amount of the additive.

Lithium Secondary Battery

Next, a lithium secondary battery according to the present invention will be described.

The lithium secondary battery according to the present invention includes a positive electrode, a negative electrode, a separator disposed between the positive electrode and the negative electrode, and an electrolyte, and, in this case, the electrolyte is the electrolyte according to the present invention. Since the electrolyte has been described above, a description thereof will be omitted and other components will be described below.

(1) Positive Electrode

The positive electrode according to the present invention may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one transition metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., LiNiO$_2$, etc.), lithium-nickel-manganese-based oxide (e.g., LiNi$_{1-Y}$Mn$_Y$O$_2$ (where 0<Y<1), LiMn$_{2-Z}$Ni$_Z$O$_4$ (where 0<Z<2)), lithium-nickel-cobalt-based oxide (e.g., LiNi$_{1-Y1}$CoY$_1$O$_2$ (where 0<Y1<1)), lithium-manganese-cobalt-based oxide (e.g., LiCo$_{1-Y2}$Mn$_{Y2}$O$_2$ (where 0<Y2<1), LiMn$_{2-Z1}$Co$_{z1}$O$_4$ (where 0<Z1<2)), lithium-nickel-manganese-cobalt-based oxide (e.g., Li(Ni$_p$Co$_q$Mn$_{r1}$)O$_2$ (where 0<p<1, 0<q<1, 0<r1<1, and p+q+r1=1) or Li(Ni$_{p1}$CO$_{q1}$Mn$_{r2}$)O$_4$ (where 0<p1<2, 0<q1<2, 0<r2<2, and p1+q1+r2=2), or lithium-nickel-cobalt-transition metal (M) oxide (e.g., Li(Ni$_{p2}$Co$_{q2}$Mn$_{r3}$M$_{S2}$)O$_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), and any one thereof or a compound of two or more thereof may be included.

Specifically, the lithium composite metal oxide may be a lithium nickel cobalt manganese-based oxide represented by Formula 3 below.

[Formula 3]

In [Formula 3], M$^1$ is a doping element substituted for transition metal sites and may include at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

A is an element substituted for oxygen sites and may include at least one element selected from the group consisting of fluorine (F), chlorine (Cl), bromine (Br), iodine (I), astatine (At), and sulfur (S).

x represents an atomic ratio of lithium to total transition metals in the lithium nickel cobalt manganese-based oxide, wherein x may be in a range of 0.8 to 1.2, for example, 1 to 1.2.

y represents an atomic ratio of nickel among the transition metals in the lithium nickel cobalt manganese-based oxide, wherein y is in a range of 0.3 or more to less than 1, preferably 0.5 to less than 1, and more preferably 0.6 to 0.98.

z represents an atomic ratio of cobalt among the transition metals in the lithium nickel cobalt manganese-based oxide, wherein z is in a range of greater than 0 to less than 0.7, preferably 0.01 or more to less than 0.5, and more preferably 0.01 or more to less than 0.4.

w represents an atomic ratio of manganese among the transition metals in the lithium nickel cobalt manganese-based oxide, wherein w is in a range of greater than 0 to less than 0.7, preferably 0.01 or more to less than 0.5, and more preferably 0.01 or more to less than 0.4.

v represents an atomic ratio of the doping element M$^1$ doped into the transition metal sites in the lithium nickel cobalt manganese-based oxide, wherein v may be in a range of 0 to 0.2, for example, 0 to 0.1. In a case in which the doping element M$^1$ is added, there is an effect of improving structural stability of the lithium nickel cobalt manganese-based oxide, but, since capacity may be reduced when the amount of the doping element is increased, it is desirable that the doping element is included at an atomic ratio of 0.2 or less.

p represents an atomic ratio of the element A substituted for the oxygen sites, wherein p may be in a range of 0 to 0.2, for example, 0 to 0.1.

Specific examples of the lithium nickel cobalt manganese-based oxide may be LiNi$_{1/3}$CO$_{1/3}$Mn$_{1/3}$O$_2$, LiNi$_{0.5}$Co$_{0.2}$Mn$_{0.3}$O$_2$, LiNi$_{0.5}$Co$_{0.3}$Mn$_{0.2}$O$_2$, LiNi$_{0.6}$Co$_{0.2}$Mn$_{0.2}$O$_2$, and LiNi$_{0.8}$Co$_{0.1}$Mn$_{0.1}$O$_2$, but the lithium nickel cobalt manganese-based oxide is not limited thereto.

The positive electrode active material may be included in an amount of 80 wt % to 98 wt %, for example, 85 wt % to 98 wt % based on a total weight of the positive electrode active material layer. When the positive electrode active material is included in an amount within the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery.

Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 0.1 wt % to 10 wt %, for example, 0.1 wt % to 5 wt % based on the total weight of the positive electrode active material layer.

Next, the binder improves the adhesion between the positive electrode active material particles and the adhesion between the positive electrode active material and a current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt %, for example, 0.1 wt % to 10 wt % based on the total weight of the positive electrode active material layer.

The positive electrode of the present invention as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support, and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of the positive electrode material mixture, manufacturing yield, and workability, and is not particularly limited.

(2) Negative Electrode

Next, a negative electrode will be described.

The negative electrode according to the present invention includes a negative electrode active material layer including a negative electrode active material, and the negative electrode active material layer may further include a conductive agent and/or a binder, if necessary.

As the negative electrode active material, various negative electrode active materials used in the art, for example, a carbon-based negative electrode active material, a silicon-based negative electrode active material, or lithium metal may be used.

As the carbon-based negative electrode active material, various carbon-based negative electrode active materials used in the art, for example, graphite-based materials such as natural graphite, artificial graphite, and Kish graphite; pyrolytic carbon, mesophase pitch based carbon fiber, mesocarbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite or artificial graphite. More preferably, the carbon-based negative electrode active material may include natural graphite and artificial graphite. In a case in which the natural graphite and the artificial graphite are used together, adhesion with a current collector may be increased to suppress exfoliation of the active material.

The silicon-based negative electrode active material may include various silicon-based negative electrode active materials used in the art, for example, at least one selected from the group consisting of metallic silicon (Si), silicon oxide ($SiO_x$, where $0<x<2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). As the element Y, Mg, Ca, Sr, barium (Ba), radium (Ra), Sc, Y, Ti, Zr, hafnium (Hf), rutherfordium (Rf), V, Nb, Ta, dubidium (db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), S, selenium (Se), tellurium (Te), polonium (Po), or a combination thereof may be used.

Particularly, in the present invention, the negative electrode may be a lithium metal negative electrode using lithium metal as a negative electrode active material, or a negative electrode including the silicon-based negative electrode active material. Since the electrolyte of the present invention includes the fluorine-based solvent, a stable solid electrolyte interphase (SEI) may be formed on a surface of the lithium metal negative electrode or the negative electrode using the silicon-based negative electrode active material in comparison to an electrolyte using other types of organic solvents, and, accordingly, it is more effective in improving the battery stability and life characteristics.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The negative electrode may be prepared by a method of preparing a negative electrode which is known in the art. For example, the negative electrode may be prepared by a method in which a negative electrode collector is coated with a negative electrode slurry, which is prepared by dissolving or dispersing the negative electrode active material as well as selectively the binder and the conductive agent in a solvent, rolled and dried, or may be prepared by casting the negative electrode slurry on a separate support and then laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 µm to 500 µm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

(3) Separator

The lithium secondary battery according to the present invention includes a separator between the positive electrode and the negative electrode.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The lithium secondary battery according to the present invention as described above may be suitably used in portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples.

EXAMPLES

Example 1

(Non-Aqueous Electrolyte Preparation)

LiFSI was dissolved in a non-aqueous organic solvent, in which methyl 2,2,2-trifluoroethyl carbonate (F3-EMC), 1,1,2,2-tetrafluoroethyl 2,2,2-trifluoroethyl ether, and fluoroethylene carbonate (FEC) were mixed in a volume ratio of 6:2:2, such that a concentration of the LiFSI was 1.0 M, and 1 wt % of vinylene carbonate and 5 wt % of a fluorine-based compound represented by the following Formula 1-1-a were added to prepare an electrolyte.

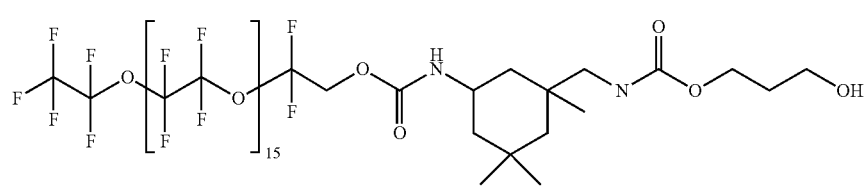

[Formula 1-1-a]

(Positive Electrode Preparation)

Li[Ni$_{0.8}$Co$_{0.1}$Mn$_{0.1}$]O$_2$ as a positive electrode active material, carbon black as a conductive agent, and polyvinylidene fluoride (PVDF), as a binder, were added to N-methyl-2-pyrrolidone (NMP), as a solvent, at a weight ratio of 90:5:5 to prepare a positive electrode active material slurry (solid content 48 wt %). A 100 μm thick positive electrode collector (Al thin film) was coated with the positive electrode active material slurry, dried, and roll-pressed to prepare a positive electrode.

(Secondary Battery Preparation)

After an electrode assembly was prepared by sequentially stacking the positive electrode prepared by the above-described method, a polyethylene separator, and a lithium metal negative electrode, the electrode assembly was put in a pouch-type secondary battery case, and the above-prepared non-aqueous electrolytes was injected thereinto to prepare a lithium secondary battery.

Example 2

A lithium secondary battery was prepared in the same manner as in Example 1 except that a non-aqueous organic solvent, in which methyl 2,2,2-trifluoroethyl carbonate (F3-EMC), 1,1,2,2-tetrafluoroethyl 2,2,3,3-tetrafluoropropyl ether, and fluoroethylene carbonate (FEC) were mixed in a volume ratio of 6:2:2, was used during the preparation of an electrolyte.

Example 3

A lithium secondary battery was prepared in the same manner as in Example 1 except that a compound of the following Formula 1-2-a was used instead of the compound of Formula 1-1-a during the preparation of an electrolyte.

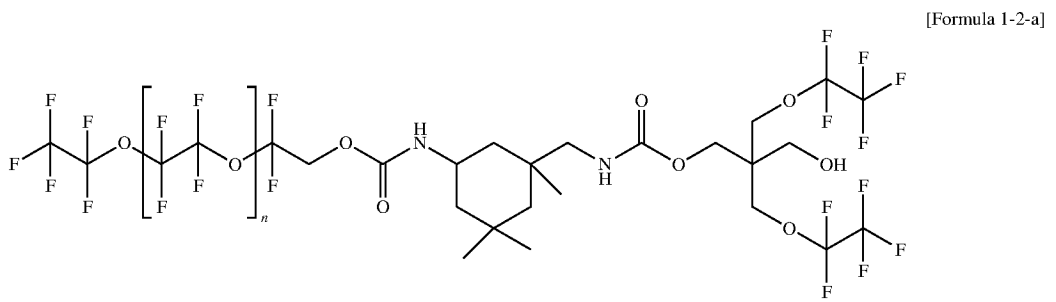

[Formula 1-2-a]

Example 4

A lithium secondary battery was prepared in the same manner as in Example 2 except that the compound of Formula 1-2-a was used instead of the compound of Formula 1-1-a during the preparation of an electrolyte.

Example 5

A lithium secondary battery was prepared in the same manner as in Example 1 except that a non-aqueous organic solvent, in which fluoroethylene carbonate (FEC), ethylene carbonate, and ethyl methyl carbonate were mixed in a volume ratio of 1:2:7, was used during the preparation of an electrolyte.

Comparative Example 1

A lithium secondary battery was prepared in the same manner as in Example 1 except that an electrolyte was prepared by dissolving $LiPF_6$ in a non-aqueous organic solvent, in which fluoroethylene carbonate (FEC), ethylene carbonate, and ethyl methyl carbonate were mixed in a volume ratio of 0.4:2.6:7, such that a concentration of the $LiPF_6$ was 1.0 M, and adding 1 wt % of vinylene carbonate.

Comparative Example 2

A lithium secondary battery was prepared in the same manner as in Example 1 except that the compound of Formula 1-1-a was not added during the preparation of an electrolyte.

Experimental Example 1: High-Temperature Life Characteristics Evaluation

That each of the lithium secondary batteries prepared by Examples 1 to 5 and Comparative Examples 1 and 2 was charged at 0.7 C to 4.2 V under a constant current/constant voltage (CC/CV) condition at 45° C. and was then discharged at a CC of 0.5 C to 3 V was set as one cycle, and 800 cycles of the charging and discharging were performed to measure a capacity retention. The capacity retention was calculated according to the following Equation (1), and measurement results are listed in [Table 1] below.

$$\text{Capacity retention (\%)} = (\text{discharge capacity after 800 cycles/discharge capacity after one cycle}) \times 100 \quad \text{Equation (1)}$$

TABLE 1

| | Capacity retention (%) |
|---|---|
| Example 1 | 90 |
| Example 2 | 86 |
| Example 3 | 89 |
| Example 4 | 84 |
| Example 5 | 81 |
| Comparative Example 1 | 79 |
| Comparative Example 2 | 64 |

Referring to Table 1, it may be confirmed that the secondary batteries of Examples 1 to 5 using the electrolyte including the fluorine-based organic solvent and the fluorine-based compound represented by [Formula 1] had better high-temperature life characteristics than the secondary batteries of Comparative Examples 1 and 2 without using the fluorine-based compound.

Experimental Example 2: Not Box Test Evaluation

Three of each of the secondary batteries prepared by Examples 1 to 5 and Comparative Examples 1 and 2 were fully charged to a state of charge (SOC) of 100% (2000 mAh) under a voltage condition of 4.2 V. Thereafter, the fully charged secondary batteries were put in a chamber at 25° C., the temperature was increased to 150° C. at a heating rate of 5° C./min, and the temperature was then maintained at 150° C. for about 60 minutes. After exposing each lithium secondary battery to high temperatures under the above-described temperature conditions, it was confirmed whether or not the battery was ignited.

A case, in which all three batteries were not ignited, was indicated as "Pass", and a case, in which more than one battery was ignited, was indicated as "Fail".

TABLE 2

| | Presence of ignition |
|---|---|
| Example 1 | Pass |
| Example 2 | Pass |
| Example 3 | Pass |
| Example 4 | Pass |
| Example 5 | Pass |
| Comparative Example 1 | Fail |
| Comparative Example 2 | Fail |

Referring to Table 2, it may be confirmed that the secondary batteries of Examples 1 to 5 using the electrolyte including the fluorine-based organic solvent and the fluorine-based compound represented by Formula 1 had better thermal stability than the secondary batteries of Comparative Examples 1 and 2 without using the fluorine-based compound.

Experimental Example 3: Electrode Adhesion Evaluation

After an activation process was performed on each of the secondary batteries prepared according to Examples 1 to 5 and Comparative Examples 1 and 2, the electrode assembly was separated from each secondary battery. Then, electrode adhesion of each electrode assembly was measured according to ASTM standard D638 (Type V specimens) at a rate of 5 mm per minute at 25° C. and a relative humidity of about 30% using Lloyd LR-10K. Measurement results are presented in [Table 3] below.

TABLE 3

|  | Electrode adhesion [MPa] |
|---|---|
| Example 1 | 3.8 |
| Example 2 | 4.2 |
| Example 3 | 3.6 |
| Example 4 | 6.2 |
| Example 5 | 2.9 |
| Comparative Example 1 | 1.7 |
| Comparative Example 2 | 0.4 |

Referring to Table 3, it may be confirmed that Examples 1 to 5 using the electrolyte including the fluorine-based organic solvent and the fluorine-based compound represented by Formula 1 had better electrode adhesion than Comparative Examples 1 and 2.

The invention claimed is:
1. An electrolyte for a lithium secondary battery, the electrolyte comprising:
a lithium salt;
a non-aqueous solvent containing a fluorine-based organic solvent; and
a fluorine-based compound represented by Formula 1,

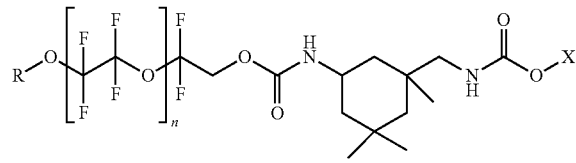

[Formula 1]

wherein, in Formula 1,
n is an integer of 1 to 300,
R is hydrogen, halogen, an alkyl group having 1 to 6 carbon atoms, or a halogen-substituted alkyl group having 1 to 6 carbon atoms, and
X is a functional group represented by Formula 2,

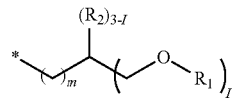

[Formula 2]

wherein, in Formula 2,
m is an integer of 0 to 4,
I is an integer of 1 to 3, and
$R_1$ and $R_2$ are each independently hydrogen, halogen, an alkyl group having 1 to 6 carbon atoms, or a halogen-substituted alkyl group having 1 to 6 carbon atoms, and, when two or more $R_1$ and $R_2$ are present, each of $R_1$ and $R_2$ is a same or different.

2. The electrolyte for a lithium secondary battery of claim 1, wherein the fluorine-based compound represented by Formula 1 comprises a compound represented by Formula 1-1 or a compound represented by Formula 1-2,

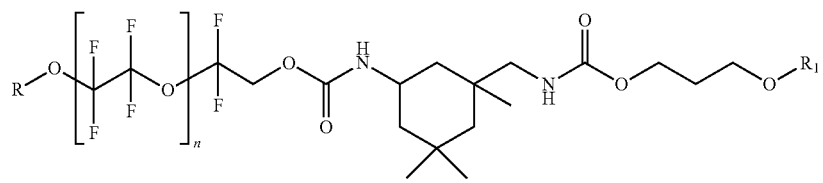

[Formula 1-1]

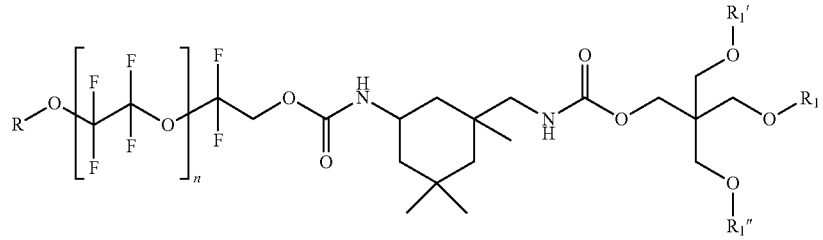

[Formula 1-2]

wherein, in Formula 1-1 and Formula 1-2,
n is an integer of 1 to 300,
R is hydrogen, halogen, an alkyl group having 1 to 6 carbon atoms, or a halogen-substituted alkyl group having 1 to 6 carbon atoms, and
$R_1$, $R_1'$, and $R_1''$ are each independently hydrogen, halogen, an alkyl group having 1 to 6 carbon atoms, or a halogen-substituted alkyl group having 1 to 6 carbon atoms.

3. The electrolyte for a lithium secondary battery of claim 1, wherein the fluorine-based compound represented by Formula 1 has a weight-average molecular weight of 60,000 g/mol or less.

4. The electrolyte for a lithium secondary battery of claim 1, wherein the fluorine-based compound represented by Formula 1 is present in an amount of 0.001 wt % to 30 wt % based on a total weight of the electrolyte.

5. The electrolyte for a lithium secondary battery of claim 1, wherein the fluorine-based organic solvent comprises fluoroethylene carbonate (FEC), difluoroethylene carbonate (DFEC), fluorodimethyl carbonate (F-DMC), fluoroethyl methyl carbonate (FEMC), 2,2-bis(trifluoromethyl)-1,3-dioxolane (TFDOL), methyl 2,2,2-trifluoroethyl carbonate (F3-EMC), trifluoroethyl phosphite (TFEPi), trifluoroethyl phosphate (TFEPa), 1,1,2,2-tetrafluoroethyl 2,2,2-trifluoroethyl ether, 1,1,2,2-tetrafluoroethyl 2,2,3,3,-tetrafluoropropyl ether, monofluorobenzene (FB), difluorobenzene, trifluorobenzene, tetrafluorobenzene, pentafluorobenzene, hexafluorobenzene, 1,1,2,2-tetrafluoro-3-(1,1,2,2-tetrafluoroethoxy)propane, methyl difluoroacetate, ethyl difluoroacetate, difluoroethyl acetate, or a mixture thereof.

6. The electrolyte for a lithium secondary battery of claim 1, wherein the fluorine-based organic solvent comprises fluoroethylene carbonate (FEC), methyl 2,2,2-trifluoroethyl carbonate (F3-EMC), 1,1,2,2-tetrafluoroethyl 2,2,2-trifluoroethyl ether, 1,1,2,2-tetrafluoroethyl 2,2,3,3,-tetrafluoropropyl ether, or a mixture thereof.

7. The electrolyte for a lithium secondary battery of claim 1, wherein the fluorine-based organic solvent is present in an amount of 5 parts by weight to 100 parts by weight based on 100 parts by weight of the non-aqueous solvent.

8. The electrolyte for a lithium secondary battery of claim 1, wherein the non-aqueous solvent further comprises a non-fluorine-based organic solvent.

9. The electrolyte for a lithium secondary battery of claim 8, wherein the non-fluorine-based organic solvent is present in an amount of 95 parts by weight or less based on 100 parts by weight of the non-aqueous solvent.

10. The electrolyte for a lithium secondary battery of claim 1, further comprising at least one of an ionic liquid, a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, or a lithium salt-based compound.

11. A lithium secondary battery comprising:
a positive electrode;
a negative electrode;
a separator disposed between the positive electrode and the negative electrode; and
the electrolyte of claim 1.

12. The lithium secondary battery of claim 11, wherein the negative electrode is a lithium metal negative electrode or the negative electrode includes comprises a silicon-based negative electrode active material.

13. The electrolyte for a lithium secondary battery of claim 1, wherein in Formulas 1 and 2, R, $R_1$ and $R_2$ are each independently hydrogen or —$CF_2CF_3$.

14. The electrolyte for a lithium secondary battery of claim 2, wherein in Formulas 1-1 and 1-2, R, $R_1$, $R_1'$, and $R_1''$ are each independently hydrogen or —$CF_2CF_3$.

15. The electrolyte for a lithium secondary battery of claim 1, wherein the fluorine-based compound represented by Formula 1 comprises a compound represented by Formula 1-1-a or a compound represented by Formula 1-2-a,

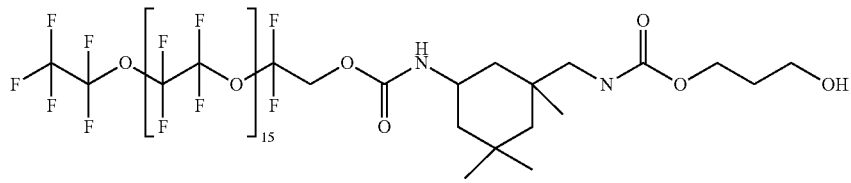

[Formula 1-1-a]

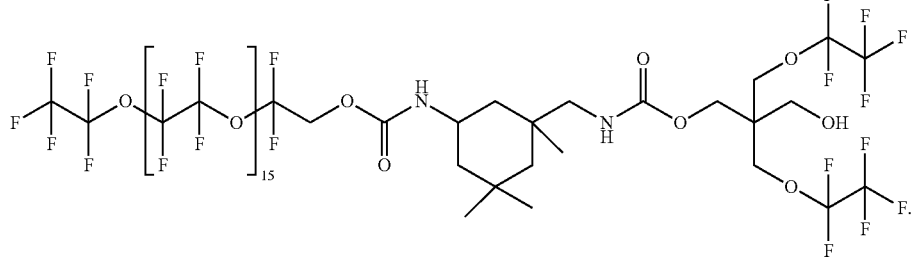

[Formula 1-2-a]

* * * * *